United States Patent [19]

Mohr et al.

[11] 4,420,340
[45] Dec. 13, 1983

[54] COLOR RETENTION PIGMENT FOR PAINT COMPOSITIONS USING LATEX VEHICLES

[75] Inventors: Bernard Mohr, Louisville, Ky.; Nicholas J. Pappas, Somers; Kuldip S. Chopra, Grand Island, both of N.Y.; George A. Salensky, Whitehouse Station, N.J.

[73] Assignee: Elkem Metals Company, Pittsburgh, Pa.

[21] Appl. No.: 440,573

[22] Filed: Nov. 10, 1982

Related U.S. Application Data

[63] Continuation-in-part of Ser. No. 343,550, Jan. 28, 1982, abandoned.

[51] Int. Cl.$^3$ .............................................. C09D 5/02
[52] U.S. Cl. .............................. 106/288 B; 524/413
[58] Field of Search .................... 106/288 B; 423/605; 524/413

[56] References Cited

U.S. PATENT DOCUMENTS

| | | | |
|---|---|---|---|
| 3,078,992 | 2/1963 | Shapiro et al. | 206/84 |
| 3,594,339 | 7/1971 | Palaika | 524/413 |
| 3,616,200 | 10/1971 | Reibach | 161/225 R |
| 3,839,076 | 10/1974 | Miller | 117/93.31 |
| 4,206,100 | 6/1980 | Kyo et al. | 525/425 |

FOREIGN PATENT DOCUMENTS 1422491  1/1976  United Kingdom ............... 313/113

*Primary Examiner*—James Poer
*Attorney, Agent, or Firm*—Eyre, Mann, Lucas & Just

[57] ABSTRACT

Manganomanganic oxide or a material containing manganomanganic oxide as its principle ingredient is used as a colorant with good staining and retention properties in compositions of water emulsion based coatings.

7 Claims, 1 Drawing Figure

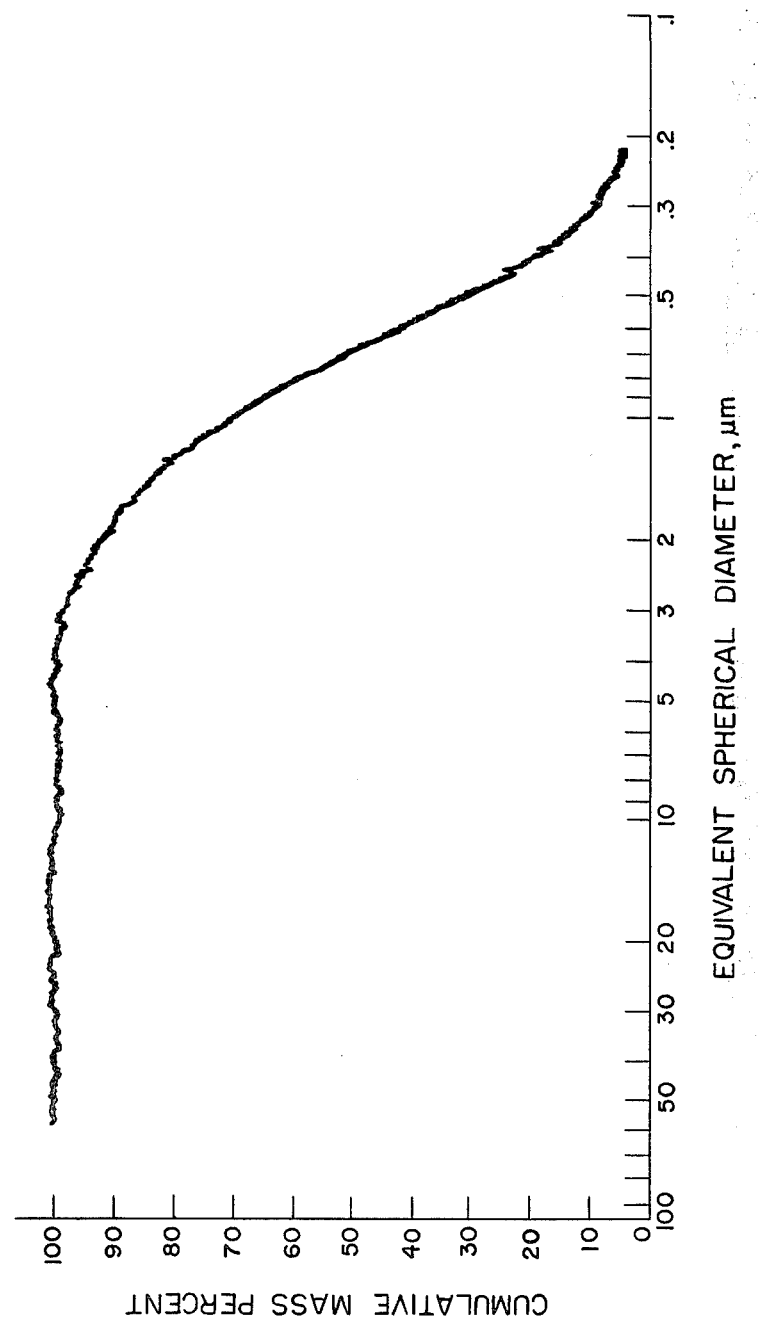

COLOR RETENTION PIGMENT FOR PAINT COMPOSITIONS USING LATEX VEHICLES

This application is a continuation-in-part of application Ser. No. 343,550 filed Jan. 28, 1982 now abandoned.

DESCRIPTION

TECHNICAL FIELD

The present invention relates generally to coatings using water emulsion vehicles. More specifically, the invention relates to water emulsion paint compositions containing a novel colorant with improved properties for enhancing the color stability of these paints.

BACKGROUND ART

Conventional water emulsion paint compositions are prepared by dispersing one or more color pigments in water containing suitable additives such as surfactants, stabilizers, dispersing agents and thickeners, followed by mixing with film formers like acrylic, acrylic, co-polymers and acrylic containing emulsions. An essential requirement of any pigment is first that it must produce a distinctive and pleasant color when added to the paint composition either alone or together with other pigments. Additionally, the pigment must be stable so as to retain its color for a prolonged period of time. Another important requirement is that the pigment should have a very finely-divided particle size generally less than about ten microns. The fineness of the particles enhances the ability of the pigment to be easily dispersed throughout the paint mixture during processing and further assures that the paint will be evenly distributed in a thin layer upon application to a surface without any streaks or other imperfections. This latter requirement is most significant of course in those instances where the paint is to be applied by conventional brush, roller or spray techniques.

It is therefore an important object of the present invention to provide an improved pigment for use in water emulsion paint compositions. Another more specific object of the present invention is to provide an improved water emulsion paint composition having good color stability and a relatively high resistance to fading upon exposure to sunlight.

DISCLOSURE OF INVENTION

In accordance with the present invention, there is provided an improved color pigment for use in water emulsion paint compositions which comprises manganomanganic oxide ($Mn_3O_4$) fume or a material containing manganomanganic oxide fume as its principle ingredient. The $Mn_3O_4$ fume colorant is first dispersed in water containing surfactants, dispersing agents, defoamers, extenders, thickeners, stabilizers, glycols and the like and then introduced into a water emulsion based on acrylics or acrylic copolymers. The $Mn_3O_4$ fume colorant may comprise from about 5 to 50% by weight of the total non-volatile portion of the paint composition.

BRIEF DESCRIPTION OF THE DRAWING

The present invention will be described in greater detail with reference to the accompanying drawing in which the sole FIGURE is a graph showing the particle size distribution for a preferred manganomanganic oxide fume containing material for use as the color pigment.

DETAILED DESCRIPTION

The present invention is based upon the discovery that manganomanganic oxide fume or a material containing predominantly manganomanganic oxide fume in a finely-divided state is a novel and ideal colorant for use in formulating a variety of water emulsion paints. In particular, the $Mn_3O_4$ fume color pigment is especially useful in those applications where conventional iron oxide pigments have heretofore been employed in the preparation of colored water emulsion paints. It has been found, for example, that finely-divided manganomanganic oxide fume when used as a color pigment exhibits a dark brown or deep reddish-brown color which is similar to but yet quite readily distinguishable from the brown color pigmentation produced by a number of synthetic iron oxide pigments, e.g., yellow, tan or red iron oxide pigments. It has also been found that $Mn_3O_4$ fume color pigment is stable at high temperatures up to about 600° C. while, on the other hand, conventional yellow or tan iron oxide pigments revert to red iron oxide when heated to temperatures of about 350° F. The $Mn_3O_4$ fume color pigment also can be produced in a wide range of particle sizes which approach or equal the particle size of conventional iron oxide pigments of the prior art. As indicated, it is desirable that the color pigment should possess a very finely divided particle size in order to enable the pigment to be uniformly distributed throughout the entire paint composition during its formulation. Generally, the manganomanganic oxide fume pigment should have a particle size of below about 10 microns.

As indicated, the color pigment used in the practice of the present invention is manganomanganic oxide fume or may be a composition or material containing predominantly manganomanganic oxide fume, i.e., greater than about 60% by weight.

The $Mn_3O_4$ fume of the present invention is most conveniently prepared by passing a stream of oxygen through or across the surface of a molten bath of ferro-manganese. Conventional ferro-manganese produced in a blast furnace or in an electro-metallurgical furnace and the like at high temperatures of about 1200° C. or more may contain up to 6 or more percent of carbon. The carbon content is usually reduced, as for example, to about 1.5% by blowing oxygen or a mixture of oxygen and air through or against the surface of a bath of molten ferro-manganese. This is done in a separate vessel that contains a molten ferro-manganese bath freshly tapped from the electric furnace and at a temperature of about 1000° C. or more and preferably at about 1300° C. or more.

One procedure for reducing the carbon content of molten ferro-manganese is described in U.S. Pat. No. 3,305,352 issued Feb. 21, 1967, the description of which is incorporated by reference herein. In this preferred procedure for producing the manganomanganic oxide fume of the present invention, ferro-manganese is tapped from the electric furnace in which it is produced into a treating vessel such as a ladle or furnace at a temperature of about 1300° C. or more. Any slag is preferably skimmed off and then oxygen is top blown against the surface of the molten ferro-manganese bath by any convenient means such as one or more conventional oxygen blowing lances held about an inch above the surface to direct one or more streams of oxygen at a pressure of about 110 to about 150 p.s.i. to impinge against the surface of the bath. The flow of oxygen is about 4 to 5 pounds per minute for a 500 pound molten bath in a ladle about 30 inches high and 20 inches inside diameter. The foregoing procedure may be scaled up as desired. The off-gas thereby produced contains very finely divided particles of manganomanganic oxide fume of spherical configuration which are easily recovered from the off-gas by conventional recovery apparatus.

If desired, the manganomanganic oxide fume of the present invention may be produced as a by-product of the specific procedure described in U.S. Pat. No. 3,305,352 for reducing the carbon content of the ferro-manganese bath. In such case, the ferro-manganese bath will be at a temperature of about 1250° C. and oxygen will be top blown at a rate sufficient to heat the bath to a temperature of 1700° C. before the carbon content of the molten metal has been reduced to 1.5%. Oxygen blowing will continue until the bath temperature reaches about 1750° C. as described in the patent. The manganomanganic oxide fume is recovered from the off-gas in conventional manner.

The terms $Mn_3O_4$ fume and manganomanganic oxide fume used in the specification and claims herein mean the finely divided spherical particles of fume recovered from the oxygen blowing of molten ferro-manganese as described above.

The following data outlines some typical characteristics of manganomanganic oxide fume produced as specified hereinabove for carrying out the present invention:

Chemical Formula: Essentially $Mn_3O_4$. Typically, 90 to 95% and more by weight manganomanganic oxide, the balance being a mixture which includes calcium oxide, magnesium oxide, potassium oxide and silica with less than about 1% by weight of free manganese metal.

Chemical Analysis (typical wt%): 65.27Mn; 2.03FE; 0.029Al; 0.28Si; 0.17C; 0.040P; 0.045As; 0.46Ca; 1.43Mg; 0.072K; 0.023Cr; and 0.002Pb.

Bulk Density: 45–90 lbs./ft$^3$.

Moisture: Typically 0.22% (1 hour at 107° C.).

Particle Size: 98% below 10 microns (99% will pass through a 325 Tyler screen).

ph: 9–13 (50% $Mn_3O_4$ in distilled $H_2O$).

Shape: Spherical.

Specific Gravity: 4.6 to 4.75 grams/cc.

Thermal Stability: No effect up to 600° C.

Present day coating technology stresses the use of color pigments having a very fine particle size in order to enhance colorant efficiency (staining and hiding power), suspension properties and uniform distribution of the pigment throughout the body of the paint formulation. It has been found that when used as a color pigment in accordance with the present invention, the $Mn_3O_4$ fume should have a particle size of below about 10 microns. Typically, $Mn_3O_4$ fume as described above may contain from about 1 to 2.0% particles of a size greater than about 10 microns. Accordingly, it may be desirable or even necessary in some cases to eliminate these large diameter particles from the $Mn_3O_4$ fume. This may be done, for example, by conventional classification techniques or by impact methods such as ball milling. Manganomanganic oxide fume which has been classified or milled to a particle size wherein 99.5% is less than about 10 microns can be readily dispersed in the paint formulation with medium shear equipment such as by use of a Cowles dissolver. Paint compositions containing $Mn_3O_4$ fume in this particle size range can generally be applied to the surface to be treated without any evidence of streaking or other imperfections.

A typical particle size distribution curve for $Mn_3O_4$ fume is shown in the graph of the sole FIGURE in the drawing. It will be seen from the curve that in the particular case of the classified $Mn_3O_4$ fume evaluated, the medium particle size distribution is about 0.68 microns.

Typical water emulsion paint compositions containing $Mn_3O_4$ fume color pigment in accordance with the present invention are represented by the following:

| Ingredients | Amount % by weight |
|---|---|
| Latex | 40–65 |
| Thickener | 0.5–12 |
| Dispersant/Stabilizer | 0.2–2.0 |
| Surfactants | 0.2–2.0 |
| Defoamer | 0.1–1.0 |
| Coalescing Agent | 0.3–6.0 |
| Preservative | 0.1–1.5 |
| Extenders | 0.0–15.0 |
| $Mn_3O_4$ fume | 5.0–30 |
| $TiO_2$ | 0.0–25.0 |
| Freeze Preventative | 0.0–8.0 |
| Alkyd Resin or Veg. Oil | 0.0–10.0 |
| Water | Balance |

The water emulsion paint compositions employing a manganomanganic oxide fume color pigment in accordance with the present invention can be made by conventional methods that are well known in the prior art. For example, the paint compositions can be prepared by first dispersing in water additives such as dispersants, thickening agents, protective colloids, defoamers, surfactants, etc. The color pigment together with an extender is then dispersed through the water solution using suitable shear equipment such as a Cowles Dissolver or Pebble Mill. The fine solid particles of pigment and extenders are brought into uniform suspension. The pigmented water solution thus obtained is then blended with latex, coalescing agent and the remaining components. Physical properties and characteristic of the paint are checked and surface tension, pH, viscosity, and pigment dispersant are adjusted as necessary. Other methods and equipment may, of course, be employed with equal success as will readily occur to those skilled in the art.

The latex or emulsion vehicle used in the paint composition according to the present invention may be any one of the well known acrylic or acrylic copolymer type latex film formers conventionally employed in the paint industry. Rhoplex AC 507, Rhoplex MV9 and Rhoplex MV23 latexes produced by Rohm and Haas Co., and UCAR 336, UCAR 515, UCAR 4341 and UCAR 4358 latexes produced by Union Carbide Corp. are typical emulsions among many commercially available today which are useful in the practice of the present invention.

Thickeners and protective colloids are used in the paint composition in order to achieve the desired consistency and viscosity. The consistancy and viscosity should be such that the paint is able to be easily applied to the surface to be treated in a uniform film of desired thickness. These additives also function as protective colloids that guard against coagulation of pigments and extenders in the presence of electrolytes or excessive shears. Thickening agents jointly with surfactants, maintain pigments in suspension and are stabilizing viscosity of the paint. The choice of a particular thickening agent will depend on a number of factors such as, for example, the type of emulsion and pigment volume concentration and coating rheology.

Generally, thickening agents, cellulosic type or salts of polyacrylic acids, conventionally used in the paint industry may be employed in the water emulsion paint compositions containing $Mn_3O_4$ fume. Suitable thickeners include, for example, salts of polycarboxylic acid such as Acrysol G-110 (trademark of Rohm and Haas Co.) or celulosic type thickeners such as QP4400 (trademark of Union Carbide Corp.). Other thickeners include those sold under the trademarks Thickener 845, Thickener 4358 and Thickener E845 (trademarks of Rohm and Haas Co.).

A combined dispersion-stabilizer agent may also be used in the paint formulation in order to assure that all of the pigment and other ingredients are uniformly dispersed throughout the paint. Various anionic, nonionic and polymer type dispersion agents can be employed for this purpose such as those produced under the trademark Tamol 731 and Tamol 850 (Rohm and Haas Co.). Other dispersants that may be employed are Triton X-100 (alkylaryl phenoxy polyethoxy ethanol), Triton X-301 (alkylaryl ether sulfate) and Triton X-405 (alkylaryl polyether alcohol), all trademarks of Rohm and Haas Co.

The paint formulations of the present invention may also include various other ingredients that are conventionally employed in paint industry. For example, a defoamer such as Nopco NDW made by Nopco Chemical Company may also be used. Conventional driers may also be employed in those instances where the paint formulation contains an alkyd resin as an ingredient. Such driers include for example cobalt and zirconium driers. A coalescing agent may also be used as 2,2,4 trimethyl 1,3 pentanediol monoisobutyrate produced by Eastman Kodak under the trade Texanol. Other known ingredients such as antioxidants, preservatives, freeze preventatives (e.g., ethylene glycol) and modifiers may also be used in the paint formulations as will readily occur to those skilled in the art.

It has been found in certain experiments that $Mn_3O_4$ fume can be combined with conventional pigments such as titanium dioxide ($TiO_2$) to produce various shades of color. For example, in one such experiment, $Mn_3O_4$ fume was blended together with different amounts of $TiO_2$ and the different shades of color so produced were recorded. in the same experiments, control samples containing 100% $Mn_3O_4$ fume and $TiO_2$ respectively were also made for comparison. It was found that the emulsion film in the case of 100% $TiO_2$ (0%$Mn_3O_4$) was "basic white," 10% $Mn_3O_4$ fume (90%$TiO_2$) was "light brown" or "beige," 40% $Mn_3O_4$ fume (60%$TiO_2$) was "medium brown" and 100% $Mn_3O_4$ fume (0%$TiO_2$) was "dark brown" or "deep reddish brown."

The color of the emulsion film in the above described experiment can be specified according to the Munsell Book of Color, Munsell Color Company, Baltimore, Md. The hue, value and Chroma were determined for each emulsion film in accordance with the procedures outlined in the Munsell Color Book and are given in Table I below. In the column labelled "Munsell No.," the first numerical value and letter designation represent the "hue," the number following the letter designation represents the "value" and the last number represents the "Chroma."

TABLE I

| | COLOR DEFINITION | |
|---|---|---|
| % $TiO_2$ | % $Mn_3O_4$ Fume | Munsell No. |
| 100 | 0 | N 9.5/ |
| 90 | 10 | 5 YR 8/2 |
| 60 | 40 | 7.5 YR 5/2 |
| 0 | 100 | 5 YR ¾ |

Based on quoted Munsell No. in Table I, it will be readily seen that the manganomanganic oxide fume colorant of the present invention will have a staining and modifying effect on other pigments such as $TiO_2$, which produce definite shades such as yellow iron oxide, Hansa yellow, chrome oxide green, phthalocyanine blue, and phthalocyanine green.

The following examples will further illustrate the practice of the present invention.

EXAMPLE 1

A water emulsion paint composition was prepared using a standard general purpose rutile grade titanium dioxide white pigment. The composition was prepared first by blending together 60.0 grams of rutile titanium dioxide; 70.0 grams of (pH 9.7) thickener, i.e., 20% water solution Thickener 745 (Rohm and Haas Co.); 2.0 grams of a dispersant/stabilizer, i.e., Tamol 850 (Rohm and Haas Co.); 10.0 grams of alkylaryl phenoxy polyethoxy ethanol, i.e., Triton 100 (Rohm and Haas Co.); 1.5 grams of defoamer, i.e., Hevi-Duty A.F. Agent (Interstab Chemicals Inc.); 2.0 grams polypropylene glycol; 20.0 grams of a coalescent, i.e., Butyl Carbitol (Union Carbide Corp.); 2.0 grams ammonium hydroxide 28%; and 87.5 grams of water. After thorough mixing, 622 grams of latex, i.e., UCAR 4358 (Union Carbide Corp.) were added to the blend.

The paint composition so prepared was spread onto the surface of several test panels made of bare aluminum measuring approximately 3×9 inches with a drawbar to a thickness of about 1 mil. The coated test panels were then allowed to cure for approximately one week at room temperature and were then subjected to fade test on a laboratory scale using ultraviolet light. In the test, the coated panels were placed on test racks and continuously exposed to a constant source of ultraviolet light in accordance with ASTM G 25-70 Fadometer Test. The test panels were periodically observed for color stability and fading over periods of up to 1,000 hours. A rating code was established for measuring the degree of fading of the test panels as follows:

Rating Code

10—No Change
9—Very Slight Change
8—Slight Change
7—Medium +
6—Medium
5—Medium −
4—Slight Bad
3—Bad
2—Very Bad
1—Partial Failure
0—Failure The results of the fade tests are given in Table II. Each rating code given in the table is preceeded by the letter "F" to indicate that the test is a fade test, except in the present example where the color pigment was $TiO_2$. $TiO_2$ pigment produces an essentially "white"

pigmentation which upon prolonged exposure to ultraviolet light will bleach. Thus, in Table II, the abbreviation "Blch" is employed to denote bleaching of the paint formulation in this example.

EXAMPLE 2

A water emulsion paint composition was prepared using the same ingredients as those employed in the paint composition of Example 1, except that in this case the 60.0 grams of $TiO_2$ were replaced by 57.0 grams of leached $Mn_3O_4$ fume. The $Mn_3O_4$ fume was leached by subjecting the fume to hydrochloric acid. Also, in this example, 73.0 grams of polycarboxylic acid thickener, i.e., Thickener 485 (Rohm and Haas Co.) were employed along with 480.0 grams of latex, i.e. UCAR 4358 (Union Carbide Corp.) instead of the 622.0 grams which were added. The paint composition was spread onto test panels in the same manner described in Example 1 and subjected to the same fade tests. The color of the film was "dark brown" or "deep reddish brown."

EXAMPLE 3

An emulsion type paint composition was prepared by dispersing extenders and pigments in an emulsion prepared by blending long oil alkyd, i.e., Aroplaz 1271 (Spencer Kellog Co.) containing cobalt and zirconium driers, with water. Into 350 grams of the alkyd emulsion, 4.0 grams of cellulosic thickener, i.e., QP 4400 (Union Carbide Corp.); 8.0 grams of anionic dispersion agent, i.e., Tamol 850 (Rohm and Haas Co.); 5.0 grams of nonionic surfactant, i.e., Triton CF-10 (Rohm and Haas Co.) an alkyl-aryl-ether type; 5.0 grams of a defoamer, i.e., Hevi-Duty A. F. Agent; 20.0 grams of ethylene glycol. Into the thus obtained vehicle, 150.0 grams of synthetic red iron oxide, 35.0 grams of extender pigment i.e. Mica 325 sold by English Mica Company; 75.0 grams of $CaCO_3$; 50.0 grams of rust inhibitive pigment, modified barium metaborate; i.e., Busan 11-M-1 (trademark of Buckman Labs, Inc.) was introduced and dispersed using a Cowles Dissolver. After thorough mixing, 500 grams of styrene-acrylic copolymer latex, i.e., UCAR 4341 (trademark of Union Carbide Corp.) and coalescing agent were added.

As in the previous examples, this paint formulation was spread onto bare aluminum test panels measuring approximately 3×9 inches with a wire wrap wet film applicator bar (Meyers) to give a dry film thickness of 1 mil. The applied film or coating was then allowed to cure at room temperature. The test panels were then placed on test racks and subjected to the same fade tests.

EXAMPLE 4

An emulsion type paint composition was prepared by blending an acrylic emulsion, i.e., Rhoplex MV 23 (Rohm & Haas Co.) together with $Mn_3O_4$ fume. The composition was as follows: 59 grams of water; 25.0 grams of 20% concentration polyacrylate thickener, i.e., Thickener E845 (Rohm and Haas Co.); 17.6 grams 40% concentration dispersant, i.e., QR-681 40% (Rohm and Haas Co.); 2.0 grams of benzylether of octylphenolethylene oxide aduct surfactant, i.e., Triton CF-10 (Rohm and Haas Co.); 28.0 grams ethylene glycol; 5.7 grams of defoamer, i.e., Foamaster NDW (Diamond Shamrock Co.); 12.0 grams of zinc oxide pigment, i.e., AZO 77 (American Zinc Co.); 53.0 grams $CaCO_3$; 2.1 grams Skane M-8 (Rohm and Haas Co.), which is (2-n-octyl-4-isothiazolin-3-one) biocide; and 151 grams $Mn_3O_4$ fume. After thorough mixing, 667.0 grams of acrylic latex, i.e., Rhoplex MV 23 (Rohm and Haas Co.), 7.0 grams of ammonium hydroxide (28%) and 5.7 grams coalescing agent, 2,2.4 Trimethyl 1,3 pentanediol-monoisobutyrate, i.e., Texanol (Eastman Kodak Co.) were added to the blend. Test panels (aluminum) were coated with this paint formulation in the same manner as described in the previous examples and the coating allowed to cure at room temperature. The color of the film was again "dark brown" or "deep reddish brown." There was basicly no difference in color between the leached and unleached $Mn_3O_4$ fume. The test panels were then subjected to the same fade tests.

The results of the fade tests using the various paint compositions described in Examples 1–4 are reported in Table II below.

TABLE II

| | | FADE TEST | | | | | | | | |
|---|---|---|---|---|---|---|---|---|---|---|
| | | Time (hrs.) | | | | | | | | |
| Example | Pigment | 50 | 100 | 200 | 300 | 400 | 500 | 600 | 750 | 1000 |
| 1 | $TiO_2$ | Blch | Blch | Blch | Blch | Blch | Blch | Blch | Blch | Blch |
| 2 | $Mn_3O_4$ fume Leached | F-8 | F-7 | F-6 | F-6 | F-6 | F-5 | F-5 | F-5 | F-5 |
| 3 | Red Oxide | F-10 | F-9 | F-9 | F-9 | F-8 | F-3 | F-3 | F-3 | F-3 |
| 4 | $Mn_3O_4$ fume | F-10 | F-9 | F-8 | F-8 | F-8 | F-8 | F-8 | F-8 | F-7 |

It will be seen from the results of the fade test reported in Table II that water emulsion paint compositions containing $Mn_3O_4$ fume pigments in accordance with the present invention exhibit color stability and fade resistance which is equal or superior to that of paint compositions containing conventional pigments of the prior art. Thus it will be noted in particular that the paint compositions in Examples 2 and 4, containing $Mn_3O_4$ fume as a color pigment demonstrated only a slight degree of fading while on the other hand, the paint composition employed in Example 3 using red oxide pigment evidenced a much greater degree of fading (i.e. from F-10 at 50 hours to F-3 at 1000 hour). As a further comparison, it will be seen from the results of Table II that paint compositions prepared using conventional titanium dioxide ($TiO_2$) as a "white" pigment showed evidence of bleaching (Example 1) after only 50 hours exposure to ultra violet light. It will be further evident from the results of Table II that the $Mn_3O_4$ fume pigment can be employed in a wide variety of paint formulations using various ingredients such as thickeners, dispersants, stabilizers, defoamers, perservatives, etc., without any adverse effect on the applied coating. It may be further noted from the test that paint formulations using leached $Mn_3O_4$ fume as the color pigment were not as stable as paint formulations using unleached $Mn_3O_4$ fume. However, the leached $Mn_3O_4$ fume when used as a colorant, presented more fade resisting properties compared with synthetic red iron oxide.

What is claimed is:

1. In a conventional water emulsion paint composition containing predominately acrylic emulsion, a thickener, dispersants and a color pigment; the improvement for enhancing the color stability and fade resistance of the paint formulation, said improvement comprising the addition to said paint formulation of a color pigment composed of finely-divided manganomanganic oxide spherical fume particles recovered from the oxygen blowing of molten ferro-manganese.

2. A water emulsion paint formulation according to claim 1 wherein said manganomanganic oxide color pigment is $Mn_3O_4$ fume having the following characteristics:
   (a) a chemical composition containing at least about 90% by weight manganomanganic oxide, the balance being a mixture including calcium oxide, magnesium oxide, potassium oxide and silica with less than about 1% by weight of free manganese metal, and
   (b) a particle size wherein 98% is less than about 10 microns.

3. A water emulsion paint composition comprising:
   from about 40 to 65% by weight of a latex composition;
   from about 0.5 to about 12% by weight of a thickener;
   from about 0.2 to 2.0% by weight of a dispersant;
   from about 0.2 to 2.0% by weight of a surfactant;
   from about 0.1 to 1.0% by weight of a defoamer;
   from about 0.3 to 6.0% by weight of a coalescing agent;
   from about 0.1 to 1.5% by weight of a preservative;
   from about 0.0 to 15.0% by weight of an extender;
   from about 5.0 to 30% by weight of $Mn_3O_4$ fume;
   from about 0.0 to 25% by weight of $TiO_2$; and the balance water.

4. A water emulsion paint formulation according to claim 3 further including from 0 to about 8.0% by weight of freeze preventative.

5. A water emulsion paint formulation according to claim 3 further including from 0 to about 10.0% by weight of an alkyd resin.

6. A water emulsion paint formulation according to claim 1 wherein said spherical manganomanganic oxide fume particles have a medium particle size distribution of about 0.68 microns.

7. The water emulsion paint composition of claim 3 which when applied by brush, roller or spraying techniques forms a uniform coating of good color stability and relatively high resistance to fading upon exposure to sunlight.

* * * * *